United States Patent [19]
Füssinger

[11] Patent Number: 5,614,680
[45] Date of Patent: Mar. 25, 1997

[54] APPARATUS FOR MONITORING THE FATIGUE STRENGTH OF STRUCTURES

[75] Inventor: Reinhold Füssinger, Friedrichshafen, Germany

[73] Assignee: Dornier GmbH, Germany

[21] Appl. No.: 558,169

[22] Filed: Nov. 15, 1995

Related U.S. Application Data

[63] Continuation of Ser. No. 331,743, Oct. 31, 1994, Pat. No. 5,520,055.

[30] Foreign Application Priority Data

Nov. 13, 1993 [DE] Germany ............ 43 38 850.7

[51] Int. Cl.⁶ ............................................. G01N 19/08
[52] U.S. Cl. ................ 73/799; 73/762; 73/787
[58] Field of Search ............ 73/762, 775, 787, 73/799, 768

[56] References Cited

U.S. PATENT DOCUMENTS

| | | | |
|---|---|---|---|
| 2,724,964 | 11/1955 | Singdale | 73/762 |
| 3,572,091 | 3/1971 | McFarland | 73/760 |
| 3,782,178 | 1/1974 | Thomas | 73/787 |
| 3,786,679 | 1/1974 | Crites | 73/787 |
| 4,590,804 | 5/1986 | Brull | 73/762 |
| 5,161,891 | 11/1992 | Austill | 73/786 |
| 5,237,875 | 8/1993 | de la Veaux | 73/775 |
| 5,319,982 | 6/1994 | Creager | 73/762 |
| 5,325,721 | 7/1994 | Pendergrass, Jr. | 73/762 |
| 5,425,274 | 6/1995 | Creager | 73/799 X |

OTHER PUBLICATIONS

Patent Abstract of Japan for JP 60-209137 dated Oct. 21, 1985.
European Search Report dated Sep. 20, 1995.

*Primary Examiner*—Elizabeth L. Dougherty
*Attorney, Agent, or Firm*—Evenson, McKeown, Edwards & Lenahan P.L.L.C.

[57] ABSTRACT

An apparatus for monitoring the fatigue strength of a structure comprises a longitudinal rib which is attached or integrated to the surface of the structure. The rib has a plurality of transverse notches of differing depths, each of the notches having a rounded end adjacent the surface of the structure and a pointed end extending toward an exterior edge of the rib.

12 Claims, 6 Drawing Sheets

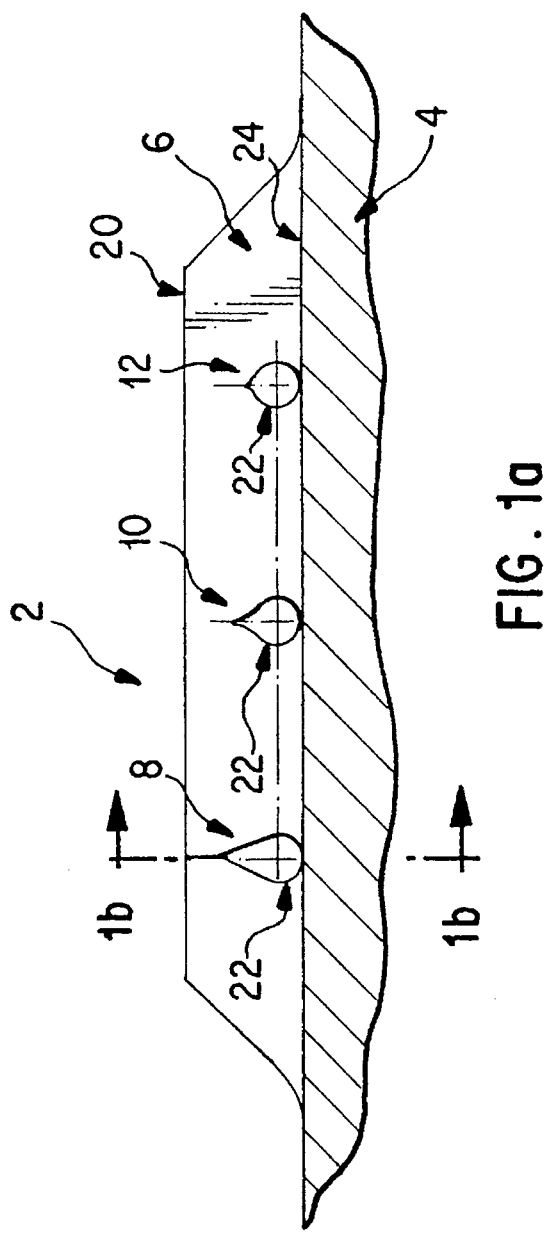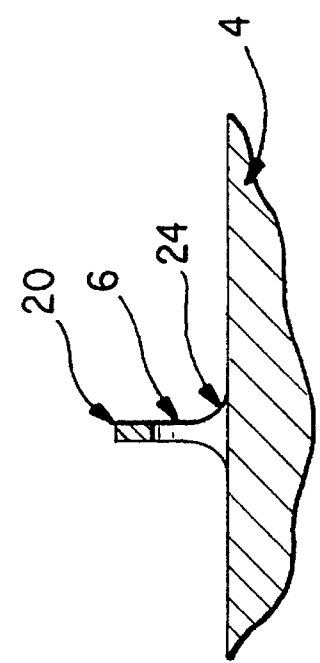

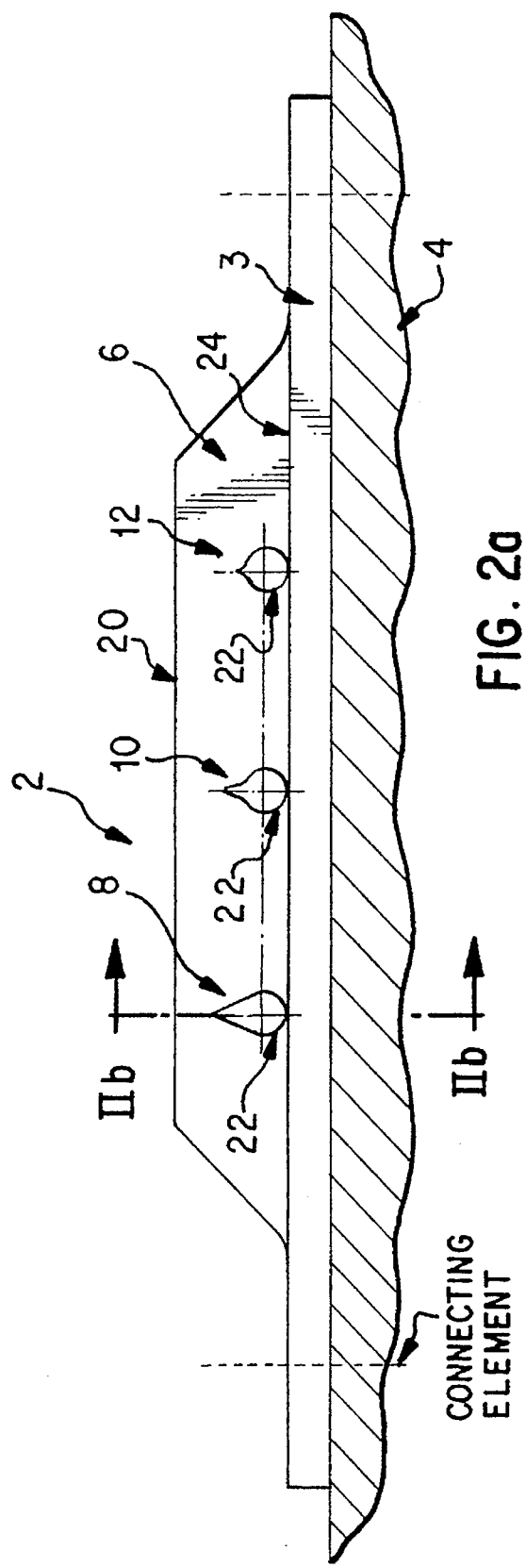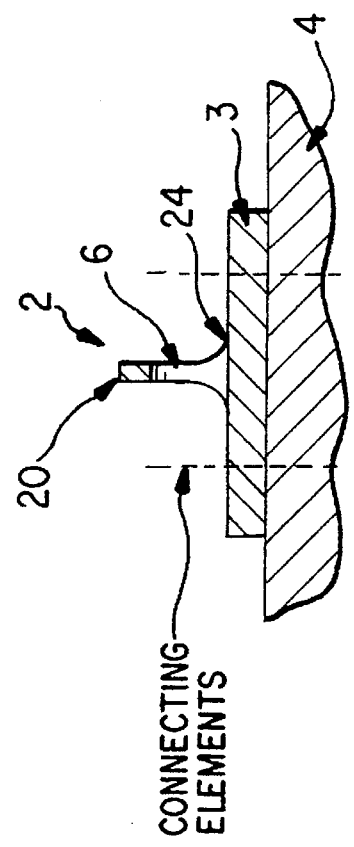

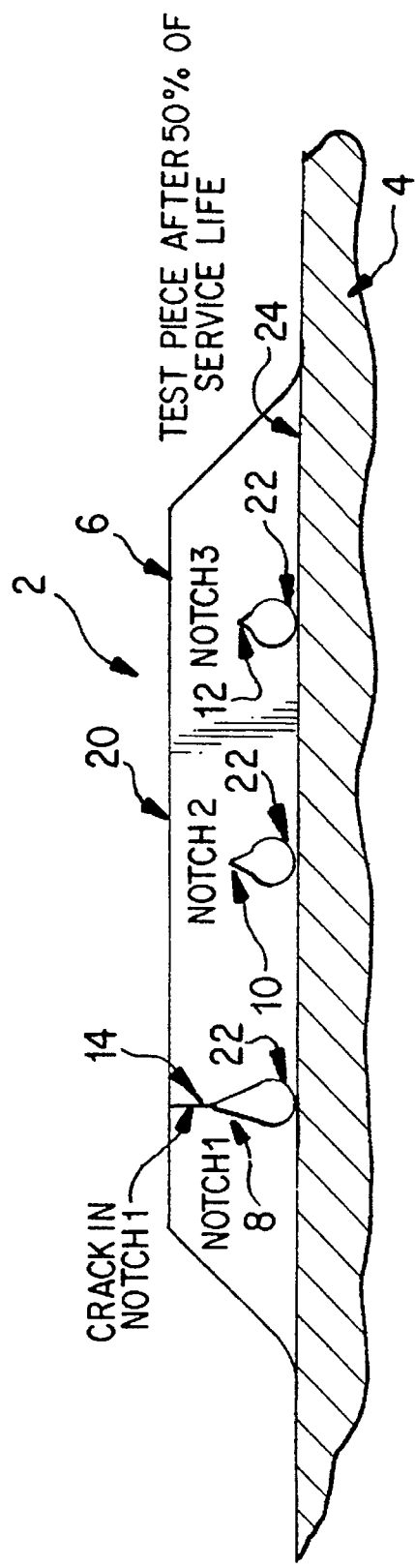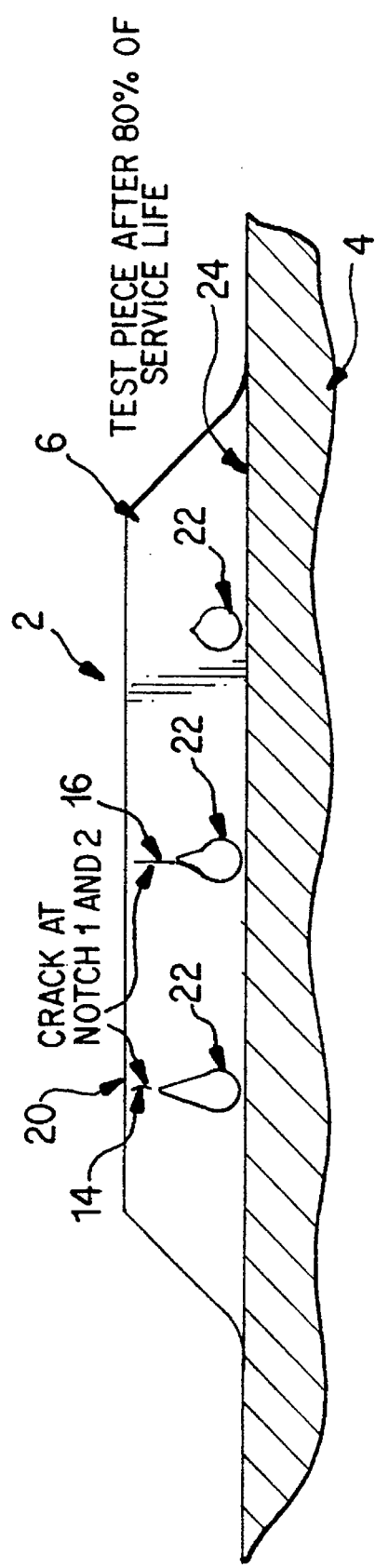

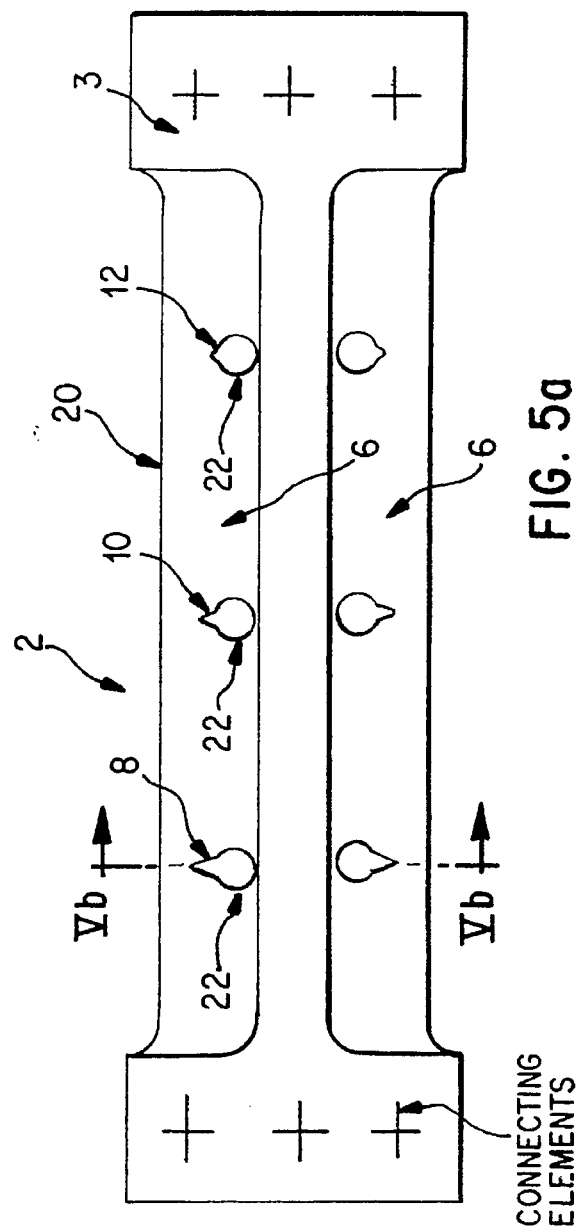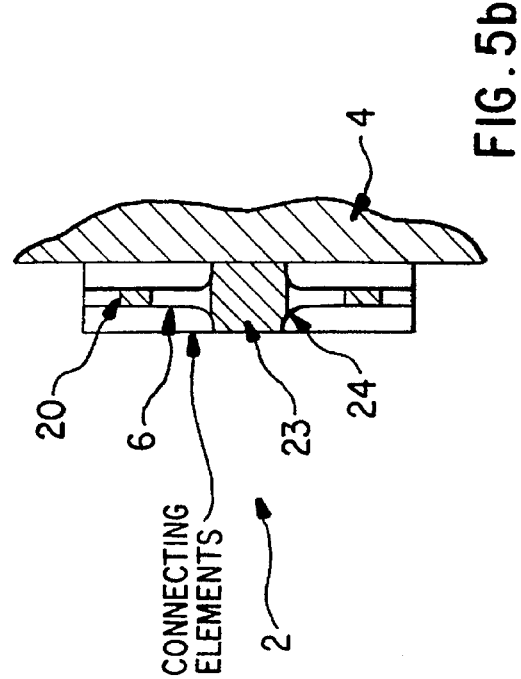

APPARATUS FOR MONITORING THE FATIGUE STRENGTH OF STRUCTURES

This is a continuation of application Ser. No. 08/331,743, filed Oct. 31, 1994, U.S. Pat. No. 5,520,055.

BACKGROUND OF THE INVENTION

This invention relates to an apparatus for monitoring the fatigue strength of structures. Such devices are also called load counters.

SUMMARY OF THE INVENTION

From the state of the art, the following types of load counters are known for measuring fatigue strength of metal structures:

1. Those which monitor the structure by means of strain gauges (DMS) and corresponding electronic analyzing systems. Such devices offer the advantage of very high precision with respect to the measuring technology. However, they also suffer from a number of disadvantages. In particular, the connection (gluing) between the strain gauge (DMS) and the structure deteriorates with age, which results in inaccuracies over time. Also, environmental influences affecting the structure, such as corrosion, are not detected. In addition, dispersions of the characteristic material values are not detected. Finally, energy for the electronic memory system is required at the structure; the system requires relatively high-expenditure analysis; and it is relatively expensive.

2. Load counters which monitor the structure by means of metal foils which change their reflection behavior as a result of expansions. Such devices require no energy at the detection point, but like the strain gauge arrangements, connection (gluing) between the strain gauge (DMS) and the structure ages, resulting in inaccuracies over time. In addition, they also have the following disadvantages:

Corrosion of the strain gauges makes them useless.

Result depends on the skill of the analyzing person.

Temperature cycles are recorded as load cycles.

Dispersions of the characteristic material values are not detected.

Environmental influences, such as corrosion, affecting the structure are not detected.

Relatively expensive.

3. An apparatus which is mounted on the structure and into which small test bars are clamped, which have different notches. This arrangement also requires no energy at the detection point. However, dispersions of the characteristic material values are not detected; environmental influences affecting the structure are not detected; and the apparatus requires relatively high expenditures and is sensitive and expensive.

It is an object of the invention to provide a load counter which detects all influences affecting the structure, including corrosion and other environmental influences, and can be read by visual monitoring.

According to the invention, this goal is achieved by a load counter which includes a rib element which is either integral to the structure to be monitored or is fixedly connected with it. The rib has several notches of differing sizes therein, which will tear at different stages of metal fatigue.

In one embodiment of the invention, a test piece which was damaged by means of different notches was integrated into the structure to be monitored. In this case, the test piece and the notches are designed so that the test piece will tear at the different notches, for example, at 50, 80 and 100% of the service life. As a result of the design of the test piece, it is achieved that the crack of a notch does not continue into the structure. Preferably, the test piece should be integrated into the structure in order to cover all dispersions of the material. If integration of the test piece into the structure is not possible, it is permissible to connect the test piece with the structure by means of suitable connecting elements (such as screws, rivets, pins).

The load counter according to the invention offers the following advantages:

No energy is required at the detection point;

Dispersions of characteristic material values are detected;

Environmental influences affecting the structure, such as corrosion, are detected.

The cost of the apparatus is relatively low and hence such load counters may also be provided several times on a structure module;

As a result, redundancy is possible and the dispersions of the load can be detected due to the modularity of bridges;

The analysis takes place within the framework of the normal inspection;

No analyzing apparatus is requires.

Other objects, advantages and novel features of the present invention will become apparent from the following detailed description of the invention when considered in conjunction with the accompanying drawings.

BRIEF DESCRIPTION OF THE DRAWINGS

FIGS. 1a and 1b are side elevation and cross sectional views of a load counter according to the invention, integrated into a structure;

FIG. 2a and 2b are side elevation and cross sectional views of a load counter screwed onto the structure;

FIGS. 4a to 4c are views of three different stages of the deterioration of the load counter of FIG. 1; and FIGS. 5a and 5b are side elevation and cross sectional views of another embodiment of the invention.

DETAILED DESCRIPTION OF THE DRAWINGS

Figure 3A:
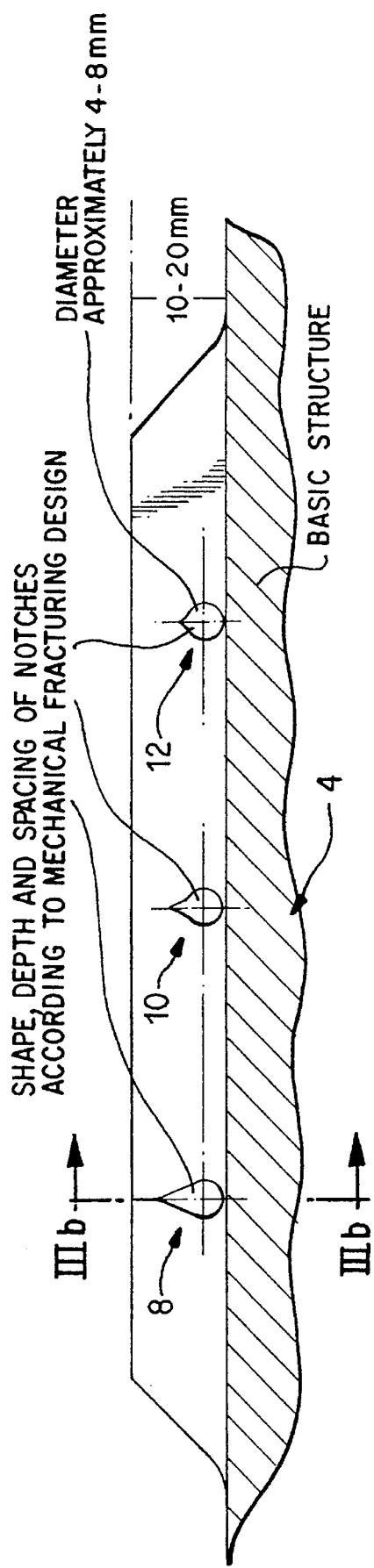
FIG. 3 is a view of examples of dimensions for the load counter of FIG. 1.

FIGS. 1a and 1b depict a load counter 2 (also called a test piece) which is integrated into a structure 4, while FIGS. 2a, b are views of a load counter 2 which is integrated into a plate 3 which is fixedly connected, for example, by means of screws, with the structure 4.

In FIGS. 1a, b and 2a, b the load counter comprises a rib 6 with notches 8, 10, 12 therein. The rib may be integrated into the structure which is to be monitored, as shown in FIGS. 1a and b, or fixedly attached to it, as shown in FIGS. 2a and b. FIGS. 1a and 2a are side elevations, while FIGS. 1b and 2b ar cross sectional views taken along lines Ib—Ib and IIb—IIb, respectively.

The mechanical fracturing design of the notches 8, 10, 12 (that is, their size, shape, spacing) is such that, after a defined deterioration of the structure 4, cracks 14, 16, 18 (FIG. 4a to 4c) will occur in a failure region which lies between the notch 8, 10, 12 and the exterior side 20 of the rib 6. On the opposite side, at the base of the notch, the test piece 2 is designed such that no incipient cracks can occur during the whole life of the structure 4. This is achieved mainly in that the notches 8, 10 12 have a large rounding 22 at their base; and the root of the notch is situated directly at the base 24 of the rib. As a result, the cross-section at the root of the notch increases considerably, and the increase of tension by the linking of the test piece remains low and uncritical. This is required particularly if the test piece 2 is already torn through in the case of the deeply notched holes. (See FIG. 5.)

Figure 3B:

Representative dimension of the load counter 2 shown in FIG. 3 as examples are: length of the rib 6, approximately 20 times the height of the rib; height of the rib 10 to 20 mm; wall thickness of the rib 1 to 4 mm. The diameter of the rounded-out notches amounts, for example, to 6 to 8 mm. Preferably, the rib 6 is made of the same material as the structure 4. This may, for example, be an aluminum alloy or steel. Basically, the load counter according to the invention may be used in the case of all ductile notch-sensitive materials.

Figure 4C:
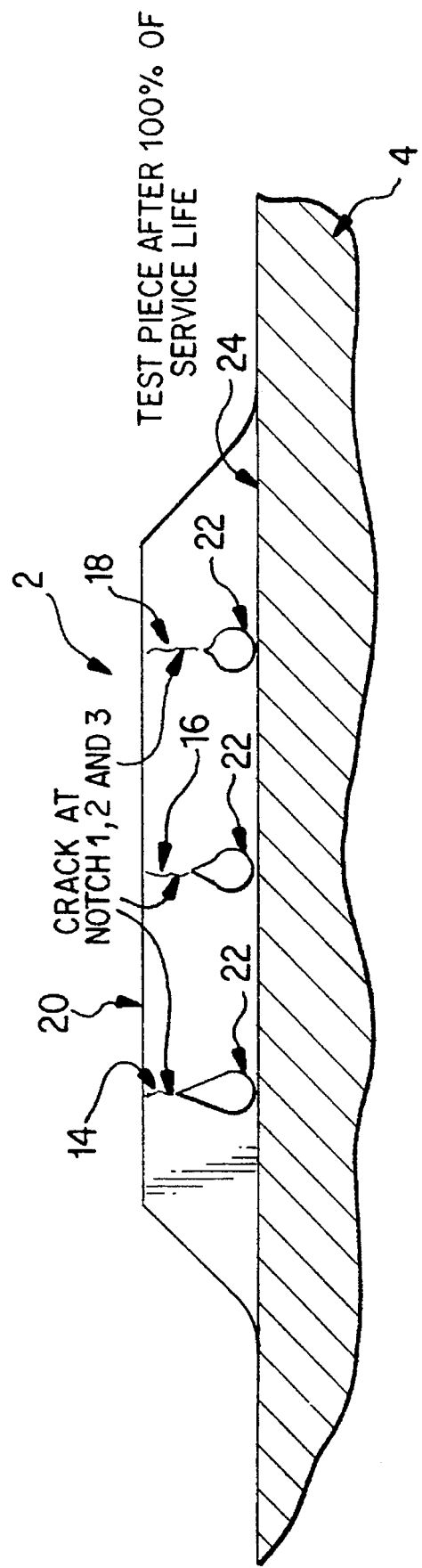

FIGS. 4a, 4b and 4c show the load counter 2 after 50%, 80% and 100% of its service life, in which the cracks 14, 16, 18 emanating from the notches 8, 10, 12 can be recognized by visual inspection without any technical devices.

FIGS. 5a and 5b show another embodiment of the load counter according to the invention in which two ribs 6 are disposed on opposite sides of a central longitudinal flange 23. As shown in the cross section view of FIG. 5b, taken along line Vb—Vb of FIG. 5a, the flange 23 is fixed (for example, by means of screws or equivalent joining devices) to the structure 4 which is to be monitored, and the ribs 6 are thus arranged in a plane parallel to the surface of structure 4. In this embodiment, therefore, deterioration and cracking of the ribs at the respective notches 8, 10, 12 is a function of the transverse flexing of the central longitudinal flange 23, which results in turn from flexing and fatigue of the monitored structure 4.

The load counter according to the invention can be used universally in all kinds of structures, such as road bridges, cranes, airplanes, ships, trains, machines.

In tests, the load counter was successfully used on modular pioneer bridges, which are designed with respect to fatigue strength (for example, 10,000 crossings of a combat tank). However, the stress to the individual modules differs considerably when the bridge is used in practice.

The parameters are:

installation point in the bridge span width of the bridge weight of the crossing vehicles.

In order to be able to judge the damage to the individual parts of a bridge as the result of this use after a specified time period, a device is required which determines this deterioration in a reliable manner. The load counter 2 according to the invention is used for this purpose.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Apparatus for monitoring fatigue strength of a structure, comprising:

at least one elongated rib element which is arranged on a surface of said structure at a point where the fatigue strength is to be monitored; and a plurality of notches in said at least one rib element;

wherein said longitudinal rib element is integral to the surface of said structure, constituting a single piece construction therewith.

2. Apparatus according to claim 1 wherein said notches have different sizes.

3. Apparatus according to claim 2 wherein said notches have longitudinal axes which are transverse to said at least one rib element.

4. Apparatus according to claim 1 wherein said notches are rounded at a first end thereof which is adjacent a surface of said structure, and have a narrow pointed end which extends toward an exterior edge of said rib element, opposite an edge thereof which joins said surface structure.

5. Apparatus according to claim 1 wherein said rib is disposed substantially normal to a surface of said structure, said notches have a longitudinal axis which is transverse to said rib element, and each of said notches has a longitudinal depth which is different from longitudinal depth of the other notches.

6. Apparatus according to claim 5 wherein said rib is disposed in a plane which is substantially normal to a surface of said structure, said notches have a longitudinal axis which is transverse to said rib element, and each of said notches has a longitudinal depth which is different from longitudinal depth of the other notches.

7. Apparatus according to claim 1 wherein said notches comprise holes having an enclosed perimeter.

8. Apparatus according to claim 7 wherein said longitudinal rib element is disposed in a plane which is substantially normal to a surface of said structure, and has an external edge area which lies in said plane transversely opposite an edge of said rib element which adjoins said surface of said structure.

9. Apparatus according to claim 8 wherein said rib element has a failure region which lies between said holes and said external edge.

10. Apparatus according to claim 9 wherein each of said holes has a rounded portion adjacent said surface of said structure and a narrow portion adjacent said failure region.

11. Apparatus according to claim 10 wherein said narrow portion of each of said holes comprises a substantially pointed configuration.

12. Apparatus according to claim 10 wherein said narrow region is substantially V shaped.

* * * * *